(12) United States Patent
Boyle et al.

(10) Patent No.: US 8,974,765 B2
(45) Date of Patent: Mar. 10, 2015

(54) METHODS AND APPARATUS FOR CONTROLLED PRODUCTION OF HYDROGEN USING ALUMINUM-BASED WATER-SPLIT REACTIONS

(75) Inventors: John F. Boyle, Emmaus, PA (US); Sean H. McIntosh, Drexel Hill, PA (US); David J. Cade, Merion Station, PA (US)

(73) Assignee: Novofuel, Inc., Centennial, CO (US)

( * ) Notice: Subject to any disclaimer, the term of this patent is extended or adjusted under 35 U.S.C. 154(b) by 29 days.

(21) Appl. No.: 13/261,237

(22) PCT Filed: Apr. 15, 2010

(86) PCT No.: PCT/US2010/001150
§ 371 (c)(1),
(2), (4) Date: May 3, 2012

(87) PCT Pub. No.: WO2011/040942
PCT Pub. Date: Apr. 7, 2011

(65) Prior Publication Data
US 2012/0225010 A1    Sep. 6, 2012

Related U.S. Application Data

(60) Provisional application No. 61/277,857, filed on Sep. 29, 2009.

(51) Int. Cl.
*C01B 3/00*    (2006.01)
*C01B 3/08*    (2006.01)

(52) U.S. Cl.
CPC ... *C01B 3/08* (2013.01); *Y02E 60/36* (2013.01)
USPC ........................................ 423/658.2; 423/657

(58) Field of Classification Search
None
See application file for complete search history.

(56) References Cited

U.S. PATENT DOCUMENTS

2005/0178061 A1* 8/2005 Tonca ................................ 48/61

FOREIGN PATENT DOCUMENTS

| EP | 1 867 603 A1 | 12/2007 | |
|---|---|---|---|
| EP | 1 908 729 A1 | 4/2008 | |
| EP | 1908729 A1 * | 4/2008 | ............. H01M 8/04 |
| WO | WO2007/089549 A2 | 8/2007 | |
| WO | WO 2007089549 A2 * | 8/2007 | ................ B01J 8/08 |
| WO | WO2008/027524 A2 | 3/2008 | |

* cited by examiner

*Primary Examiner* — Melvin C Mayes
*Assistant Examiner* — Michael Forrest
(74) *Attorney, Agent, or Firm* — Todd N. Hathaway

(57) ABSTRACT

A method and apparatus for producing hydrogen using an aluminum-based water-split reaction, in which water is reacted with metallic aluminum, at least one-soluble inorganic salt catalyst that causes progressive pitting of the metallic aluminum, and at least one metal oxide initiator that increases temperature upon exposure to water. The solid reactant materials are differentially distributed in a matrix relative to at least one inlet for introducing water to the matrix. The differential distribution affects at least one characteristic of the reaction, such as the rate, temperature, pressure and products of the reaction, the latter comprising one or more of hydrogen, heat and steam. The water-soluble inorganic salt catalyst may be sodium chloride, potassium chloride and combinations thereof, and the metal oxide initiator may be magnesium oxide, calcium oxide and combinations thereof. The solid reactant materials may be differentially distributed by concentrating at least one of the solid reactant materials in at least one area of the matrix relative to the inlet. One or more of the solid reactant materials may be concentrated proximate the inlet so as to achieve a rapid initial reaction upon introduction of water, or may be concentrated in defined packets at spaced apart locations within the matrix to achieve a more moderated action. The solid reactant materials may be positioned in layers arranged concentrically or spirally about the water inlet. The layers may be formed of a water permeable substrate, such as a fiber wool or mat material having the reactant materials deposited thereon. The substrate including the reactant materials may be stored in a disposable container, to which water is introduced via the inlet at the time of use.

48 Claims, 5 Drawing Sheets

METHODS AND APPARATUS FOR CONTROLLED PRODUCTION OF HYDROGEN USING ALUMINUM-BASED WATER-SPLIT REACTIONS

RELATED APPLICATIONS

This application claims the benefit of U.S. Provisional Patent Application Ser. No. 61/277,857 filed on Sep. 29, 2010.

BACKGROUND a. Field of the Invention

The present invention relates generally to methods and apparatus for production of hydrogen, and, more particularly to methods and apparatus for producing hydrogen from an aluminum-based water-split reaction in a manner that is tailored to meet the requirements of particular equipment or applications, by differential distribution of one or more of the solid reactant materials in a matrix or other body such that areas of the differential distribution are contacted by the water in a sequential manner.

b. Related Art

As is well known, hydrogen gas has many different uses in a wide range of industries and activities. Perhaps the best known use is as a fuel, such as for combustion or use in a fuel cell, but there are many others, including lift gas for balloons or other lighter-than-air devices, use in certain types of welding, creation of artificial atmospheres for certain types of diving (diving air), and use in certain types of batteries, (e.g., pressurized nickel-hydrogen batteries), to give just a few examples.

Although it therefore has great utility, distribution of hydrogen has long been hampered by the difficulties inherent in storing and transporting it in gaseous form. When uncompressed (i.e., at atmospheric pressure) the gas simply occupies too much volume for practical use, and furthermore the gas generally needs to be under pressure for most uses. Storage in compressed form, however, requires use of pressure vessels of some form, which are typically heavy, bulky and dangerous to transport, as well as being relatively expensive. Typical are the ubiquitous high-pressure gas cylinders made of steel, commonly referred to as "K-cylinders." These steel cylinders are notoriously heavy, cumbersome and difficult to transport, to the point where they are simply unsuitable for many applications that involve portability. The dangers that they present have also caused them to be prohibited from use in certain environments, for example, onboard certain naval vessels. Still further, conventional gas cylinders typically require valves and/or regulators to discharge the hydrogen at the required pressures/rates, which adds to complexity and cost. The cost of gas cylinders also makes it economically unviable to simply dispose of them after use, so that they must be transported back to a facility to be refilled at still additional cost. These sundry difficulties and expenses have the combined effect of rendering the use of hydrogen impractical in many circumstances where it would otherwise be beneficial.

An alternative to storing and shipping hydrogen as a pressurized gas is to generate it on location from chemical reactions using materials that can be stored/transported without needing pressure vessels. Water-hydride reactions (e.g., water+ lithium hydride) are perhaps the most well know, however the reactions are notoriously difficult to control, being rapid and highly exothermic, to the point of being potentially dangerous in some situations. Furthermore, disposal is a problem due to the potentially hazardous nature of the reaction products.

Hydrogen gas can also be produced using aluminum-based water-split reactions, which generally exhibit much more benign characteristics than hydride-based reactions. The reactions between aluminum and water ($2Al+6H_2O \rightarrow 2Al(OH)_3+3H_2\uparrow$; $2Al+4H_2O \rightarrow 2AlO(OH)+3H_2\uparrow$; $2AL+3H_2O \rightarrow Al_2O_3+3H_2\uparrow$) are well known, but until recently their use in practical applications has been problematic due to the phenomenon known as "passivation": Bare metallic aluminum almost immediately forms a very inert aluminum oxide layer on its surface that shields the underlying bulk aluminum and thereby inhibits further reactions between the aluminum metal and surrounding gases or liquids. A number of different approaches were previously developed in an effort to overcome the passivation problem, such as mechanically modifying particles of aluminum by milling or fracturing, but these have generally proven too energy-intensive and/or expensive to be economically viable. More recently though, as exemplified by the process disclosed in PCT Patent Application No. WO 2008/027524, it has been found that the passivation problem can be overcome using a water-soluble inorganic salt such as sodium chloride or potassium chloride as a "catalyst" that causes progressive pitting of the aluminum; These salts remove the passivation layer, through corrosive attack of the surface. In addition by adding certain metal oxides, such as calcium oxide or magnesium oxide, the reaction can be accelerated as a result of the heat generated when the metal oxides are exposed to water. The particles of metallic aluminum, salt catalyst and metal oxide initiator are (in the prior art) blended together into a homogenous, powder-like mix, to which water is added (or vice versa) to produce hydrogen when desired. The dry materials are safe and easy to store and transport, and the reaction products are substantially inert and environmentally benign and therefore can be readily disposed of almost regardless of location.

Although generally successful in overcoming the problem of passivation per se, the system described in the preceding paragraph is subject to inherent limitations that make it less than completely satisfactory for many applications. A particular problem involves the difficulty of adjusting or tailoring the speed or other characteristics of the reaction to the divergent requirements of different applications: For example, certain applications, such as filling balloons for meteorological or military applications, require that large volumes of hydrogen be produced in a very rapid manner. Other applications such as supplying hydrogen for use by a fuel cell, welding apparatus or other device normally call for a slower rate of production over a much longer period of time. Also, certain applications may call for production of heat/steam together with the hydrogen, whereas in other cases these products may be undesirable.

As compared with hydride-based reactions, the basic aluminum-catalyst-initiator system does offer greater controllability, but nevertheless with significant limitations. For example, the reaction may be controlled to a certain extent by metering the rate at which water is introduced to the blended material, while measuring pressure or otherwise monitoring the rate at which the hydrogen is produced; however, the metering and monitoring devices, such as valves, sensors, microprocessors, and so on, represent significant complexity, weight and expense, and moreover the rate of control that can be achieved in this manner is subject to certain practical limitations. Changing the proportions of the constituents (metallic aluminum-salt-catalyst-metal oxide initiator and metal hydroxide) in the particulate blend can also provide some degree of adjustability, but the range of adjustment that can be achieved in this manner is comparatively limited and inadequate to meet the requirements of many differing applications such as those discussed above.

Accordingly, there exists a need for methods and apparatus that can effectively produce hydrogen gas on location by chemical reaction, so as to obviate the distribution problems associated with use of compressed hydrogen gas. Furthermore, there exists a need for such methods and apparatus that permit the rate, temperature and other characteristics of the reaction to be configured or adjusted to meet the divergent needs of different applications. Still further, there exists a need for such methods and apparatus that can be configured or adjusted to produce heat and/or steam as products where desired. Still further, there exists a need for such methods and apparatus that make effective use of aluminum-based water-split reactions, so as to avoid the drawbacks inherent in hydride-based reactions and the like. Still further, there exists a need for such methods and apparatus that are economical in nature, can be conveniently and safely implemented in a wide variety of locations and conditions, and that present minimal costs and environmental/safety concerns relating to disposal of the expended materials.

SUMMARY OF THE INVENTION

The present invention addresses the problems cited above, and provides methods and apparatus for producing hydrogen, plus heat and steam when desired using an aluminum-based water-split reaction, that offer the ability to control and tailor the characteristics of the reaction and thereby the output to meet the needs of differing applications.

In a broad aspect, the method comprises the steps of (a) providing a matrix having at least one inlet for introducing water at a predetermined location; (b) providing a plurality of solid reactant materials for reacting with water to produce hydrogen, the solid reactant materials comprising: metallic aluminum, at least one water-soluble inorganic salt catalyst that causes progressive pitting of the metallic aluminum to sustain reaction of the metallic aluminum with water, and at least one metal oxide initiator that upon exposure to water causes an increase in temperature to initiate reaction of the water with the metallic aluminum; (c) differentially distributing the plurality of solid reactant materials in the matrix relative to the at least one inlet so that at least one of the solid reactant materials is present at a selected area in the matrix relative to the inlet in an amount that is proportionately greater than at least one other of the solid reactant materials; and (d) introducing water into the matrix through the at least one inlet so that a flow of the water contacts the area of the matrix containing the proportionately greater amount of at least one solid reactant material and other areas in the matrix in a sequential manner so as to affect at least one characteristic of the reaction of the water with the solid reactant materials to produce hydrogen.

The step of differentially distributing the plurality of reactant materials relative to the at least one inlet may comprise differentially distributing the solid reactant materials so as to affect at least one characteristic of said reaction selected from the group consisting of rates of the reaction, temperatures of the reaction, pressures of the reaction, products of the reaction, and combinations thereof. The products of the reaction may comprise one or more of amounts of hydrogen produced by the reaction, amounts of heat produced by the reaction, and amounts of steam produced by the reaction.

The water-soluble inorganic salt catalyst may be selected from the group consisting of sodium chloride and potassium chloride and combinations thereof, and the metal oxide initiator may be selected from the group consisting of magnesium oxide and calcium oxide and combinations thereof.

The step of distributing the solid reactant materials may comprise concentrating the at least one solid reactant material in at least one predetermined area. The step of concentrating the at least one solid reactant material in at least one predetermined area may comprise positioning the solid reactant materials in a plurality of layers in the matrix. The plurality of layers may be arranged concentrically or spirally about a centrally located inlet for the water. The step of concentrating the at least one solid reactant material in at least one predetermined area may also comprise placing the at least one solid reactant material in defined packets at spaced-apart locations within the matrix. The at least one solid reactant material may also comprise only one of the solid reactant materials or a combination thereof.

The step of concentrating the at least one solid reactant material in at least one selected area of the matrix may comprise the step of concentrating the metal oxide initiator in an area proximate the at least one water inlet, so as to achieve a rapid increase in temperature immediately upon introduction of water via the inlet. The step may also comprise concentrating the inorganic salt catalyst proximate the at least one inlet so as to achieve a rapid increase in dissolved salt catalyst upon introduction of water via the inlet. Alternatively or additionally, the step of concentrating the at least one solid reactant material in at least one selected area in the matrix may comprise concentrating the at least one metal oxide initiator at a plurality of spaced locations through the matrix so as to achieve a moderated or comparatively constant level of temperature increase upon introduction and/or reintroduction of water via the at least one inlet; similarly, the at least one inorganic salt catalyst may be concentrated in a plurality of spaced locations in the matrix so as to achieve a moderated increase in dissolved salt catalyst as water is introduced.

The step of distributing the solid reactant materials in the matrix may comprise the steps of depositing the solid reactant materials on at least one water permeable substrate, and placing in the matrix the permeable substrate having the solid reactant materials deposited thereon. The water permeable substrate may be formed of a fibrous mass, such as a mass of metallic or nonmetallic fiber wool material. The step of placing the substrate in the matrix may comprise placing the substrate in a container so as to form an expendable cartridge.

In a broad aspect, the apparatus comprises: (a) a matrix having at least one inlet for introducing water at a predetermined location therein; (b) a plurality of solid reactant materials for reacting with water to produce hydrogen, the solid reactant materials comprising: metallic aluminum; at least one water-soluble inorganic salt catalyst that creates progressive pitting of the metallic aluminum to sustain reaction of the metallic aluminum with water, and at least metal oxide initiator that upon exposure to water cause an increase in temperature to initiate reaction of the water with the metallic aluminum; (c) the plurality of solid reactant materials being differentially distributed in the matrix relative to the at least one inlet so that at least one of the solid reactant materials is present at a selected area in a matrix relative to the inlet in an amount that is proportionately greater than at least one other of the solid reactant materials, so that when water is introduced into the matrix through the at least one inlet the flow of water will contact the area of the matrix containing the proportionately greater amount of at least one solid reactant material and other areas in the matrix in a sequential manner so as to affect at least one characteristic of the reaction of the water with the solid reactant materials to produce hydrogen.

The plurality of solid reactant materials may be differentially distributed in the matrix relative to the at least one inlet so as to affect at least one characteristic of the reaction selected from the group consisting of rates of the reaction, temperatures of the reaction, pressures of the reaction, products of the reaction, and combinations thereof. The products of the reaction comprises one or more of amounts of hydrogen produced by the reaction, amounts of heat produced by the reaction, and amounts of steam produced by the reaction.

The plurality of solid reactant materials may comprise solid reactant materials in particulate form. The water-soluble inorganic salt catalyst may be selected from the group consisting of sodium chloride and potassium chloride and combinations thereof, and the metal oxide initiator may be selected from the group consisting of magnesium oxide and calcium oxide and combinations thereof.

The at least one solid reactant material may be concentrated in at least one predetermined area in the matrix. The differentially distributed solid reactant materials may be positioned in a plurality of layers in the matrix. The plurality of layers may be arranged concentrically or spirally about a generally centrally located inlet for the water. The at least one solid reactant material may also be concentrated by placing the at least one solid reactant material in defined packets at spaced apart locations in a matrix. The at least one solid reactant material that is concentrated may comprise only one of the solid reactant materials or may comprise a combination of at least two of the solid reactant materials.

The at least one solid reactant material that is concentrated in at least one selected area of the matrix may comprise the at least one metal oxide initiator concentrated in an area proximate the at least one water inlet, so as to achieve a rapid increase in temperature immediately upon introduction of water via the inlet. The inorganic salt catalyst may also be concentrated proximate the at least one inlet so as so as to achieve a rapid increase in dissolved salt catalyst upon introduction of water via the inlet. Alternatively or additionally, the metal oxide initiator may be concentrated at a plurality of spaced locations through the matrix, so as to achieve a moderated, comparatively constant level of temperature increase upon introduction and/or reintroduction of water via the at least inlet. The at least one water-soluble inorganic salt catalyst may also be concentrated at a plurality of spaced locations within the matrix, so that the salt catalyst is dissolved in a moderated manner as water is introduced into the matrix.

The apparatus may further comprise at least one water permeable substrate on which the plurality of solid reactant materials are deposited to be placed in the matrix. The water permeable substrate may be formed of a fibrous mass, such as a mass of metallic or nonmetallic fiber wool material.

The water permeable substrate may comprise at least one layer that surrounds an inlet tube having a plurality of openings for distributing water into the matrix. The at least one layer of permeable material may comprise a plurality of layers of the permeable material, with differing combinations of the plurality of solid reactant materials deposited thereon. The layer of fibrous substrate material may also comprise a layer of the fibrous material having a first one or combination of the plurality of solid reactant materials distributed generally thereover, and at least one packet of one or a combination of a plurality of solid reactant materials placed at a discreet predetermined location or locations thereon.

The apparatus may further comprise a container that encloses the permeable substrate and plurality of solid reactant materials so as to form an expendable cartridge. The at least one layer of permeable substrate may be rolled spirally about the water distribution tube to form a cylindrical fuel body that is enclosed within the container. The container may have an inlet connection at at least one end thereof for admitting water to the distribution tube in the fuel body. The container may comprise a generally cylindrical container, suitably formed of thin aluminum metal to form a conveniently handled and economically disposable cartridge assembly.

These and other features and advantages of the present invention will be more fully understood from a reading of the following detailed description with reference to the accompanying drawings.

DETAILED DESCRIPTION

Figure 1:
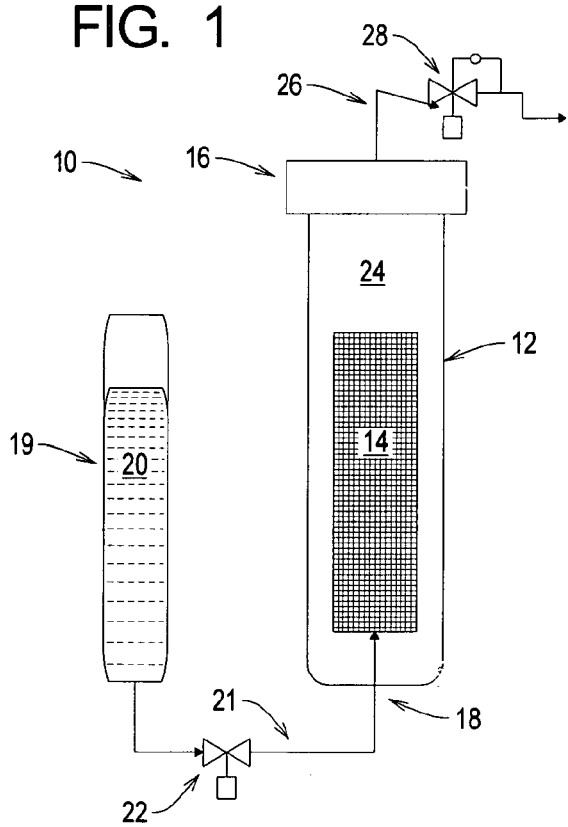
FIG. 1 is a simplified, somewhat schematic view of a hydrogen generation apparatus in accordance with the present invention, showing a cartridge that contains the dry reactant materials housed in the exemplary reaction chamber thereof and the manner in which a supply of water that is fed to the cartridge to produce the reaction.

FIG. 1 shows in simplified form a basic reactor unit 10 for generating hydrogen in accordance with the present invention. As can be seen, the unit includes a reaction vessel or chamber 12 that receives disposable fuel cartridges 14, the reaction chamber having an access lid 16 at its upper end and a water 18 at its lower end. An associated reservoir 19 holds a supply of water 20, with flow thereof through the supply line 21 being controlled by an actuating valve 22.

As will be described in greater detail below, the expendable cartridge 14 contains the dry reactant materials for the sustainable aluminum-based water-split reaction described above, namely, particulate metallic aluminum, a water-soluble inorganic salt catalyst and a metal oxide initiator, but with one or more of the components separated out or concentrated in areas/zones or "packages" that are configured to produce a reaction rate and/or other characteristics that are tailored to the requirements of a particular application. Characteristics that may be adjusted or otherwise affected by the differential distribution of the solid reactant materials include, but are not limited to, the rate, temperature, pressure and desired products of the reaction, the main desired products of the reaction including, depending on application, hydrogen, heat and/or steam.

Upon opening valve 22, water passes through line 18 (e.g., by pressure or gravity) and enters the lower end of the cartridge 14 as shown in FIG. 1. As will be described in greater detail below, contact between the water and the dry materials in the cartridge initiates the aluminum-based water-split reaction, resulting in release of hydrogen gas from the cartridge, together with heat and steam depending on design. In the illustrated embodiment, the gas is collected in the head space 24 between the upper end of the cartridge 14 and the chamber lid 16, from which it is bled off under pressure via $H_2$ supply line 26. It will therefore be understood that the reaction chamber 12, including chamber lid 16, needs to be constructed so as to be able to contain the pressure of the accumulated gas, however, such pressure would normally be much lower than those involved in a K-cylinder or similar vessel, and the chamber is much smaller, so that the weight involved will be much smaller.

The hydrogen gas is supplied via line 26 to the user equipment or device, which may be for example of any of the types noted above. Depending on application, a pressure regulator valve 28 may optionally be included in the $H_2$ supply line; in certain applications the pressure regulator may be replaced by a back pressure, regulator to control the pressure of the reactant chamber.

As was noted above, a central aspect of the present invention, that allows tailoring of the reaction characteristics to the requirements of particular applications, is that the dry reactant materials forming the "fuel" of the reaction are differentially distributed in a designed manner rather than being homogenously blended as in prior approaches within an overall matrix. One or more of the materials may be substantially or completely segregated from the others in selected areas, or they may be located in areas of increased concentration or density relative to other areas, or be distributed in other arrangements designed heterogeneity. Moreover, the materials may be separated into packets, zones or the like having distinct boundaries, or there may be gradual or less distinct transitions between areas in some embodiments. Mesh, coarse-fiber "wool" or other permeable packaging and/or substrate materials including materials that dissolve or partially dissolve may be used to construct or define the areas containing the separated reactant materials, or the areas may be formed by zones or regions within the mass of the fuel itself. Moreover, it will be understood that particulate form is generally preferred for the components of the fuel, to provide rapid solubility and reaction rates, but this may not necessarily be so in all embodiments, and in some cases the salt catalyst or possibly another reactant or combination thereof may be in larger or even monolithic pieces.

As will be described in greater detail below, relative concentration or segregation of one or more of the reactant materials allows the materials to be positioned in a predetermined manner (e.g., spatial relationship, orientation, or other arrangement) with respect to one another and also to the direction of flow of water entering the matrix containing the dry fuel, thereby permitting both timing/sequence of exposure to the water and also the concentrations of material dissolved in the flow to be adjusted as desired. Adjustment of these aspects in turn provides a significant degree of control over the characteristics of a resulting reaction, allowing the designer to tailor those characteristics to the requirements of a particular application. For example, the components can be arranged to achieve a quick startup followed by the relative high rate of reaction and production of hydrogen, or to instead provide a less rapid startup and a slower and steadier production of hydrogen, as may be desired for a particular purpose. The arrangement of the fuel materials relative to the water flow and each other can be used to produce higher or lower reaction temperatures (including production of steam, if desired), optimize the reaction for higher or lower pressure outputs, construct cartridges for one-time or multiple use, and so on.

Figure 2:
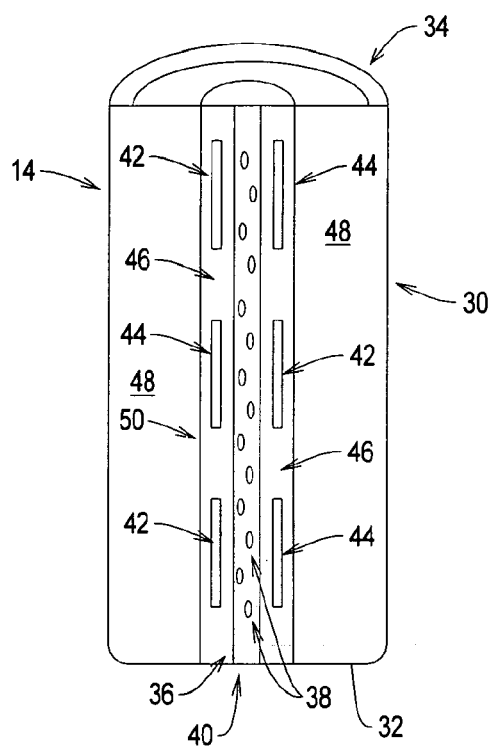
FIG. 2 is a longitudinal cross-sectional view a reactant cartridge such as that used in a hydrogen generator of FIG. 1, showing the distribution of the components thereof about a central water inlet to tailor the characteristics of the reaction to the requirements of a particular application.

FIGS. 2-7 illustrate exemplary arrangements of the dry/solid components relative to the flow of water, with numerous additional configurations being possible. In the embodiment that is illustrated in FIG. 2, which is an enlarged, cross-sectional view of the exemplary reactant cartridge 14 shown in FIG. 1, the reactant is contained within a generally cylindrical shell 30 suitably formed of thin aluminum metal. In general shape and material the shells somewhat resembles a conventional aluminum beverage can, which has the benefit that it can be produced inexpensively using widely available equipment without significant modification. The lower end of the shell is closed by a bottom wall 32 while at the upper end there is an opening 34, the latter being formed by removal of a pull away lid (not shown) prior to use.

Figure 3:
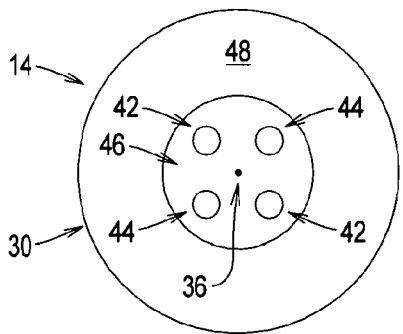
FIG. 3 is a transverse cross-sectional view of the fuel cartridge of FIG. 2, showing the distribution of the components thereof about the central water inlet in greater detail.

As can be seen with further reference to FIG. 2 and also FIG. 3, the reactant materials contained with the cartridge 14 are arranged in a generally concentric/radial pattern about an axial, centrally located water distribution tube 36. In the embodiment that is illustrated, the water distribution tube 36 has a hollow core with a plurality of perforations 38, through which water flows longitudinally into the cartridge and then outwardly into the surrounding materials, but it will be understood that in some embodiments a simple passage or bore formed in the materials without perforations may be used; it will similarly be understood that in some embodiments the water inlet may include or communicate with manifolds, distribution tubes, bores, channels and other features or structures for introducing water to the matrix along one or more relatively defined paths, with the differential distribution of the solid reactant materials being arranged relative to the flow path or paths accordingly.

Water enters tube 36 through a central opening 40 that communicates with water injection tube 18 where the latter enters the bottom of the reaction chamber 12; the opening may suitably be formed by a spike-shaped water nozzle (not shown) at the end of injection tube 18, that pierces the bottom wall 32 of the container when it is set into and pressed downwardly within the reaction chamber.

As can most easily be seen in FIG. 3, packets 42, 44 of the metal oxide initiator (suitably, calcium oxide, magnesium oxide or a combination thereof) and water-soluble inorganic salt catalyst (suitably, sodium-chloride, potassium chloride or a combination thereof) are arranged in an alternating, radial pattern about the central water distribution tube 36, and are embedded in a comparatively loosely packed mass of particulate aluminum 46 that extends concentrically around the distribution tube. Arranged outwardly and concentrically around the relatively loosely packed aluminum particulate is a somewhat more densely packed mass of particulate aluminum 48, the latter being surrounded by the cylindrical shell 30. In the illustrated embodiment, the "packets" of metal oxide initiator 42 and soluble inorganic salt catalyst are arranged in an alternating fashion, both around the water distribution tube and over the length of the cartridge (see FIG. 2), to provide more even distribution, however it will understood that this is not essential and that in some embodiments single packets may extend the full length of the cartridge; furthermore, the cylindrical, generally rod-shaped configuration of the packets shown in FIGS. 2-3 facilitates insertion during manufacture of the cartridge, but this again is somewhat arbitrary in nature and other shapes/configurations may be used. To assist in handling and manufacture, the packets may be formed by a layer or layers of water-soluble permeable material enclosing the reactant material, and the loosely packed aluminum particulate may be contained within a water soluble or permeable sleeve 50 that separates it from the concentrically outward mass of aluminum particulate 48, such as a porous mat or screen, but again such features may not be present in all embodiments and the separate materials may simply be in direct contact with one another. Other forms of shells and containers may also be used in some embodiments, including containers formed of steel and other metals, as well as of non-metallic materials, including biodegradable materials to facilitate disposal materials to facilitate disposal in certain embodiments.

Referring again to FIGS. 2-3 and also FIG. 1, when water is introduced through the opening 40 at the bottom of the fuel cartridge, it flows upwardly through the distribution tube 36 and from there outwardly through the loosely packed aluminum particulate into contact with the packets of metal oxide initiator and water-soluble inorganic salt catalyst. The comparatively loose packing of the aluminum particulate 46 allows the water to flow rapidly therethrough, so that the water contacts the metal oxide almost immediately to cause a rapid increase in temperature of the surrounding mass. Similarly, the salt catalyst in packets 44 is rapidly dissolved and distributed into the loosely packed particulate 46. In combination, the resulting burst of heat and high concentration of salt catalyst cause the reaction to initiate almost instantaneously, so that significant volumes of hydrogen gas are produced without appreciable delay. Thereafter, the heat radiates outwardly from the core area into the more densely packed mass 48 of particulate aluminum, which provides the main body of "fuel" in the cartridge, while the dissolved salt simultaneously flows through the permeable sleeve 50 and likewise into the main mass 48 of particulate aluminum; as is discussed in the reference cited above, the chloride ion supplied by the salt, which creates the anti-passivation effect, is not consumed in the reaction, and therefore remains until all of the aluminum has been consumed.

The net effect of the design shown in FIGS. 2-3 is a process that begins producing hydrogen almost immediately and continues to produce large volumes in a rapid manner until the supply of particulate aluminum is exhausted. These characteristics are well tailored to certain purposes, including for example supplying lift gas for inflation of balloons for meteorological/military purposes, will be described in greater detail below. After the cartridge has been expended it can be removed from the reaction chamber and discarded, the "waste" product being safe and environmentally benign as noted above. Another cartridge can then be inserted into the reaction chamber and used to generate additional hydrogen when desired. A supply of the cartridges may be kept on hand in a carton or case, being lightweight, safe and requiring no special storage or handling procedures.

Use of the fuel cartridges together with a dedicated hydrogen reactor apparatus, such that shown in FIG. 1, provides several advantages, including the ability to use lightweight, simple and inexpensive cartridges, and also the ability to use cartridges of different types and characteristics in a single reactor apparatus to meet differing needs. It will be understood, however, that in some embodiments one or all of the reactor functions may be incorporated into a single, possibly disposable device: For example, a fuel cartridge may be provided that incorporates an integrated reservoir holding a supply of water, and that may moreover incorporate features for collection and discharge of the hydrogen gas to a user device.

Figure 4:
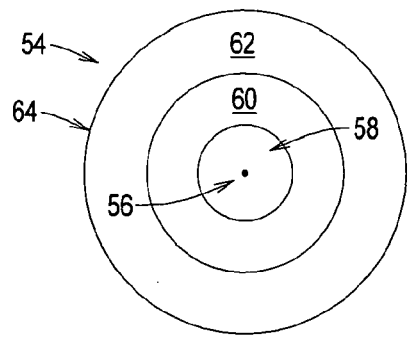
FIG. 4 is a transverse cross-sectional view of a reactant cartridge in accordance with another embodiment of the present invention, in which the chemical components are distribution in a generally concentric pattern about the central water inlet rather than being radially distributed locations as in the embodiment of FIGS. 2-3.

FIGS. 4-7 illustrate additional, exemplary forms of construction for fuel cartridges in accordance with the present invention. For example, FIG. 4 shows a cartridge 54 in which the dry reactant materials are arranged in sequential, concentric layers about the water distribution tube 56. In this embodiment, the particulate metal oxide initiator 58 is arranged in a generally coaxial mass about the water distribution tube 56, so that upon introduction of water the initiator is the first material to be contacted so as to cause a rapid rise in temperature, and in particular causing heating of the water that is flowing therethrough. The heated water then enters a mass of the particulate, water-soluble inorganic salt 60 that is arranged concentrically about the metal oxide core, so that the elevated temperature of the water causes the salt to dissolve in a rapid and efficient manner. The flow of water then carries the dissolved salt (i.e., the chloride ions) outwardly and radially into the mass of particulate aluminum material 62 that is arranged concentrically around the inner two layers, inside the cylindrical shell 64 of the cartridge. The high temperature and concentration of the chloride ions again produces a rapid reaction with the particulate aluminum, generating large volumes of hydrogen in a rapid manner until the fuel is exhausted. By comparison with the embodiment shown in FIGS. 2-3, the cartridge having the construction shown in FIG. 4 may not have the almost instantaneous "kickoff" and generation of hydrogen that is a feature of the former, but its construction is simpler and initiation is still relatively rapid, and it can be configured to generate hydrogen at a comparatively steady rate once commenced.

Figure 5:
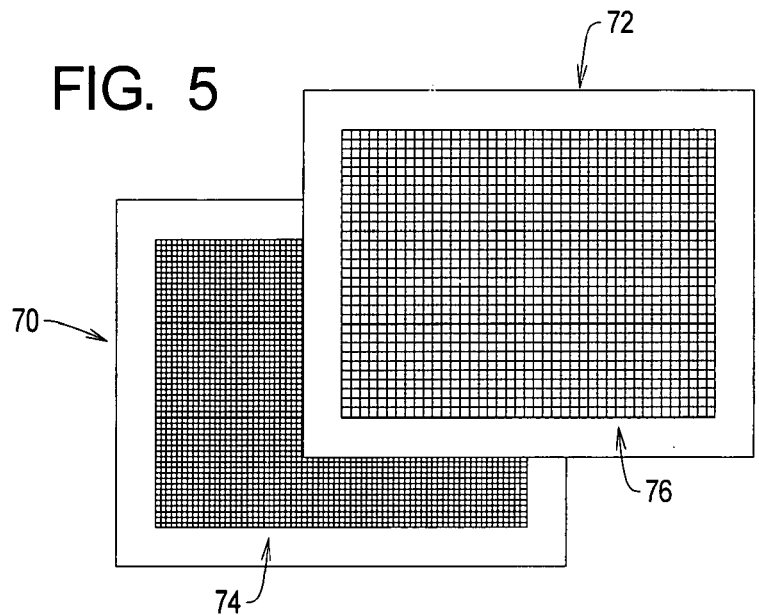
FIG. 5 is a plan view of first and second flexible sheets of water permeable material on which the dry reactant materials are deposited for formation of a fuel cartridge in accordance with another embodiment of the present invention.
Figure 6:
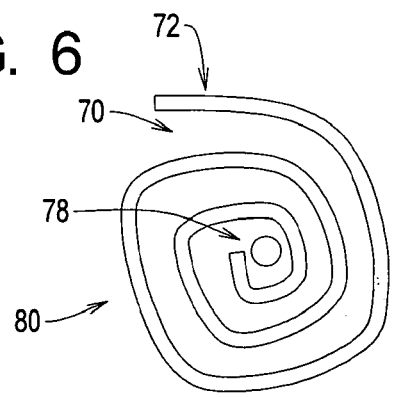
FIG. 6 is a transverse cross-sectional view of a fuel cartridge that is formed by rolling the sheets of FIG. 5 together to form adjoining layers that overly one another in a spiral pattern about the central water inlet of the cartridge.

FIGS. 5-6 illustrate an embodiment in which the body of the cartridge is formed of multiple layers of flexible water permeable/porous material that are rolled together to form a spiral pattern through which the introduced water passes in a sequential manner. The example shown in FIG. 5 includes a pair of layers 70-72, each of which is formed of a cloth or fiber bat material constructed of inorganic or organic fibers or organic (e.g., metal fiber, glass fiber, cotton fiber) through which water is able to pass more-or-less freely; eminently suitable fiber materials include aluminum wools, stainless steel wools and silica wools (e.g., materials selling under the trade names Kaowool™ and Superwool™), which form relatively optimal substrates into which the particulate materials can be poured and retained. The first layer 70 includes a pattern of fuel 74 that is deposited on, imbedded within or adhered to the fibrous material, and in this embodiment is composed of a combination of particulate aluminum and the water-soluble inorganic salt catalyst. The second layer 72 has a similar construction, and includes a second pattern of fuel 76 that is composed of a combination of particulate aluminum and the metal oxide initiator.

As can be seen in FIG. 6, the two layers 70, 72 are placed atop one another and then rolled around a water distribution tube 78, with the first layer 70 innermost, to form a spiral arrangement of alternating layers in a roll 80 that can be fitted within a cylindrical shell (not shown) to form the fuel cartridge. Water introduced through the distribution tube 78 therefore passes first through the area formed by layer 70 so as to dissolve the salt catalyst and pick up the chloride ion that prevents passivation, and immediately thereafter flows into the adjoining layer 72 containing the particulate aluminum and the metal oxide initiator that raises the temperature to initiate the reaction. As opposed to the arrangements of the embodiment shown in FIGS. 2-3 and 4, generation of hydrogen again begins quickly, but is more easily tailored to produce a steady yield at lower volumes; varying the amounts/concentrations of the reactant materials on the layers, as well as varying the permeability of the material used so as to control (in conjunction with pressure) the rate of flow of water therethrough provides the designer with opportunities to control the characteristics of the reaction comparatively precise manner. Moreover, the layered construction lends itself to construction of cartridges that can be used multiple times (e.g., by selectively stopping and restarting the flow of water) as opposed to the more single use, "one-shot" nature of the embodiments described above.

Figure 7:
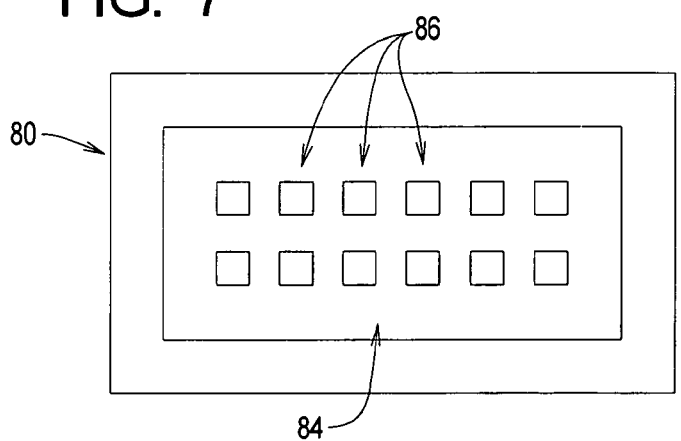
FIG. 7 is plan view of a flexible layer or sheet of water permeable material having the separate chemical components deposited in a predetermined pattern thereon, the layer being rolled up in the manner shown in FIG. 6 to form a fuel cartridge in accordance with another embodiment of the present invention.

FIG. 7 illustrates an embodiment that is somewhat similar to that of FIGS. 5-6 in that it utilizes a layer of fibrous/permeable material that is rolled up to form the body of the cartridge, but in this instance with a single layer 82 of substrate material having the dry reactant materials placed in packages or otherwise deposited at discrete locations in a predetermined pattern thereon. In this example, a mixture of particulate aluminum and water-soluble inorganic salt catalyst is deposited on/in the fibrous substrate in a substantially continuous layer over substantially the full length and width of the sheet. Packages or packets 86 formed of a mixture of particulate aluminum and metal oxide initiator are, in turn, deposited at a plurality of discreet, spaced-apart locations along the substrate. The fibrous substrate, which as noted above is suitably formed of a metallic or nonmetallic "wool" material, is then rolled up to form a cylindrical body having a spiral cross-section, for being placed in the shell of a cartridge in substantially the same manner as described above with reference to FIG. 6.

A particular advantage of the embodiment that is shown in FIG. 7 is the comparative ease with which a fine degree of control can be exercised over the characteristics of the reaction, by selective sizing and positioning of the packets of initiator mix relative to the main layer of particulate aluminum fuel. For example, the packets can be comparatively small and distributed more or less evenly with respect to the main layer, as shown in FIG. 7, to produce a relatively steady reaction and moderated production of hydrogen and to also allow the reaction to be readily stopped and restarted by stopping and restarting the introduction of water. Alternatively, more closely spaced packets and/or large packets of initiator mix may be used to produce higher temperatures and faster reaction rates, or larger or more closely clustered packets may be grouped or placed at the end of the "blanket" of fibrous material that will be closest to the water injection tube then rolled up to provide a quick startup of the reaction immediately upon introduction of water through the tube. It will be understood that these are only a few examples of possible arrangements, and that many others may be used.

Figure 8:
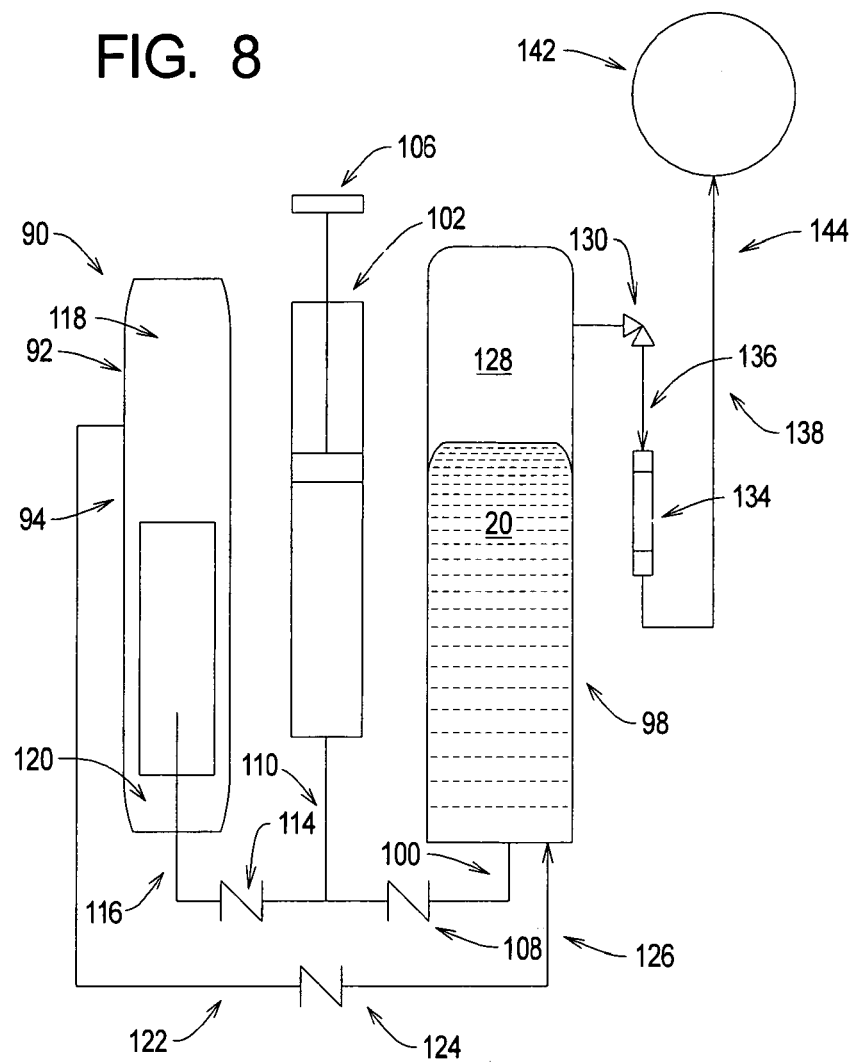
FIG. 8 is a diagrammatic view of a hydrogen generating apparatus in accordance with an embodiment of the present invention in which the reaction characteristics are tailored to provide lift gas for inflation of a balloon used, for example, for meteorological or military functions, as well as in other applications.
Figure 9:
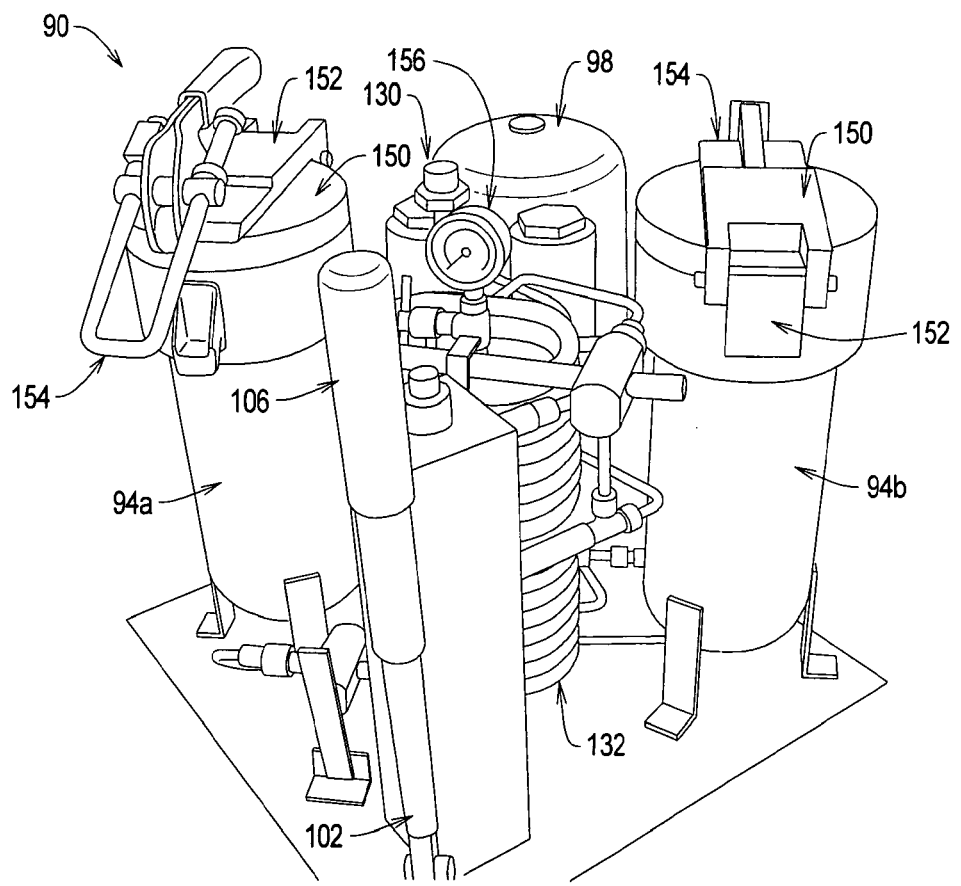
FIG. 9 is a perspective view of the apparatus of FIG. 8, showing the components thereof in greater detail.
Figure 10:
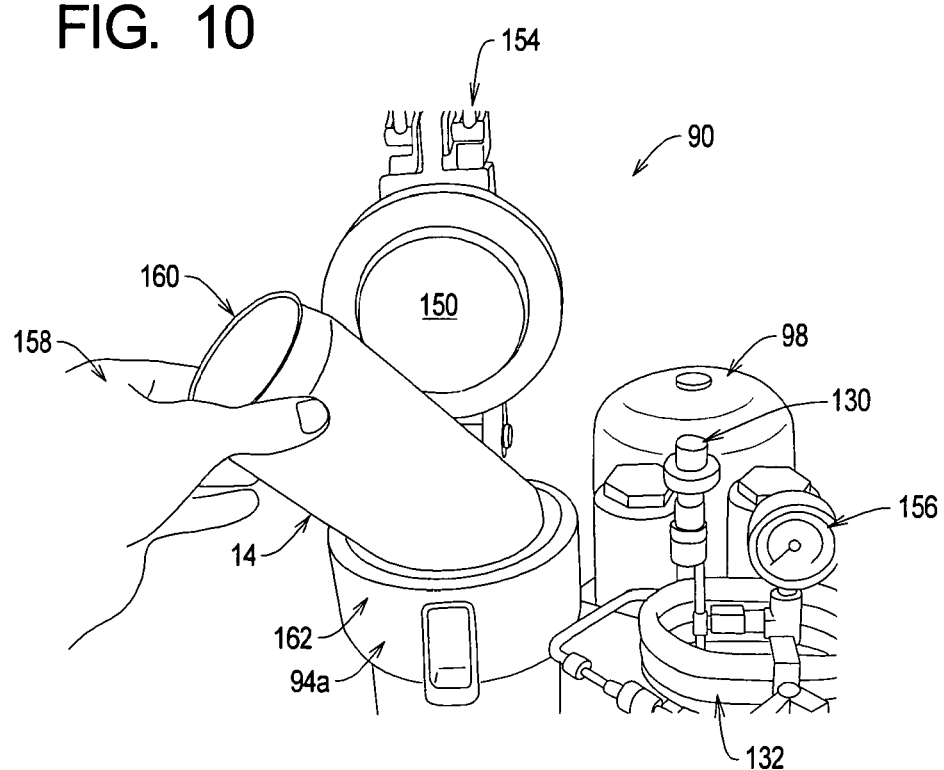
FIG. 10 is a partial perspective view of the apparatus of FIG. 9, showing the manner in which a fuel cartridge such as that of FIG. 2 is inserted in one of the reaction chambers of the apparatus for generation of hydrogen thereby.

FIGS. 8-10 illustrate an embodiment of the invention with respect to an exemplary application, namely, providing hydrogen lift gas for inflating balloons for meteorological (weather) and military functions. FIG. 8 shows the apparatus somewhat schematically, similar to FIG. 1, while FIGS. 9-10 show the elements of the apparatus in greater detail.

As can be seen, FIG. 8 shows a hydrogen generator 90 having a reaction chamber 92, generally similar to that of FIG. 1, that receives a fuel cartridge 94. In the illustrated embodiment, the cartridge suitably has the same configuration as the fuel cartridge 14 that is shown in FIGS. 1-2, but it will be understood that other configurations may also be used.

A supply of water 96 is contained in an onboard reservoir 98, again in a manner similar to that described above. Water is drawn from the reservoir through a water supply line 100 by a manual pump 102 having a piston 104 that is actuated by a handle 106. On the intake stroke, water is drawn through supply line 100 and through a first check valve 108, and from there through a branch line 110 into the cylinder 112 of the pump. Then on the compression stroke, water is discharged from cylinder 112 through line 110, and passes via a second check valve 114 and water injection line 116 into the interior of the fuel cartridge 14, with backflow to the reservoir being prevented by the first check valve 108.

Entry of water into the fuel cartridge initiates the reaction in the manner previously described, producing hydrogen gas that is captured within the interior spaces 118, 120 of the reaction chamber. The accumulated hydrogen gas as bled under pressure from the reaction chamber via a hydrogen supply line 122 and a check valve 124 enters the lower end of the reservoir arrow 198 as indicated by arrow 126. The hydrogen gas bubbles through the volume of water 96, cooling the gas and also preheating the water; preheating the water further increases efficiency of the system, and also pressurizes the reservoir to alleviate the need for subsequent pumping. The hydrogen gas then accumulates in the upper volume 128 of the reservoir, above the level of the water, from which is bled via a pressure regulator or back pressure regulator 130 to an inline desiccant tube 132, as indicated by arrow 134. The desiccant tube serves to dry the hydrogen, after which it passes through a discharge line 138 and into the interior volume 140 of a balloon 142, as indicated by arrow 144. The cartridge can be designed to produce a volume of hydrogen sufficient to fill a single balloon, i.e., each cartridge fills one balloon, after which it is discarded; alternately, the cartridge can be designed to produce a larger volume of hydrogen, and after the first balloon has been filled the flow of gas can be stopped by a valve (not shown) fitted in discharge line 138, with subsequent balloons being filled as desired.

FIGS. 9-10 show the generator 90 in greater detail. As can be seen in FIG. 9, the apparatus preferably includes a pair of reaction chambers 94a, 94b connected to a single water reservoir 98 that also acts as a buffer, so as to be able to provide a continuous output of hydrogen gas by reacting cartridges in alternating chambers. Similar to FIG. 1, each reaction chamber includes a lid 150 that has a hinge 152 on one side and that is selectively clamped in a sealed position by a locking handle 154 on the other. Also shown is the pump 102 that is operated by handle 106, the pressure regulator 130, a pressure gauge 156, and the inline desiccant tube 132, which in this instance has a coiled configuration for enhanced space/packaging efficiency.

As can be seen in FIG. 10, a cartridge 14 is fed into the reactor 90 by opening the lid 150 of one of the reaction chambers 94a, 94b, and then inserting the cartridge by hand 158 into the interior of the chamber with the open end 160 thereof (the end cap having been removed) disposed upwardly. In so doing, the bottom wall of the cartridge contacts and is punctured by the nozzle of the water injection tube, in the manner described above. The lid 150 is then pivoted downwardly about hinge 152 and locked down by handle 154 to seal the chamber. The water input line is lined up to select the reaction chamber that is loaded with the cartridge, and water is injected into the cartridge to commence the reaction in the manner described above.

After the cartridge has been expended to produce a volume of hydrogen, the locking handle 154 is released and the lid 150 is pivoted back to the open position as shown in FIG. 10. The cartridge can then be grasped and withdrawn with a stepped, increased diameter upper portion 162 of the chamber forming an angular gap around the cartridge into which the user's fingers can be inserted. Since the expended cartridge and reaction products are entirely safe, no protective clothing is required, and the cartridge can be disposed of in a convenient manner without danger to the environment.

Figure 11:
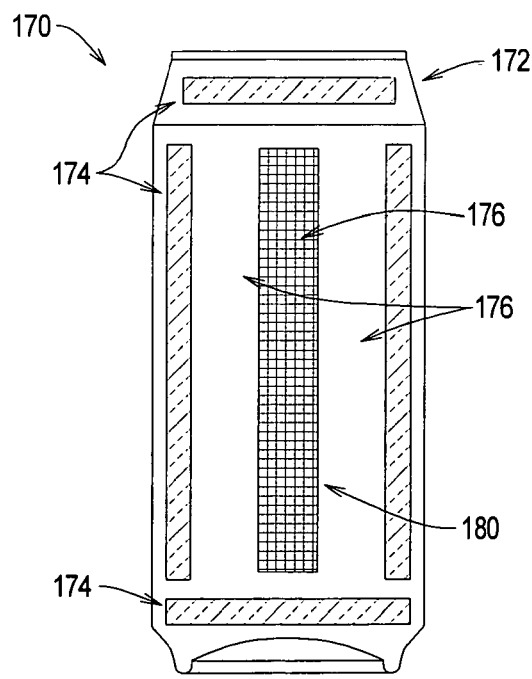
FIG. 11 is a longitudinal cross-sectional view of a reactant cartridge in accordance with another embodiment of the present invention, having co-axial compartments for the reactant materials that are divided by a metallic mesh, housed in an economical aluminum container that is disposable or can be recycled together with the expended reactant materials and products.

FIG. 11 is a cross-section of a cartridge 170 in accordance with another embodiment of the present invention, demonstrating implementation using an economical, standardized aluminum container as the housing of the cartridge. In this example, the housing is formed by a standard 32-ounce disposable aluminum can 172 of a general type available from various suppliers, including the Ball Corporation (Broomfield, Colo.); as noted above, use of an off-the-shelf aluminum container that itself is designed to be disposable greater enhances economy of the system.

As can be seen with further reference to FIG. 11, the can 172 forming the housing is lined around the side and at the ends by layers of insulation 174, suitably formed of a fibrous, non-metallic insulation material. Inside of the insulation are two coaxial compartments 176, 178, divided by a metallic mesh 180. The inner compartment 176 contains a mixture of aluminum, organic salt, and metal oxide which acts as a "starter pack"; this compartment contains a higher percentage of metal oxide in this compartment in order to provide rapid heating that jump starts the reaction. The outer compartment 178, in turn, contains the same materials but with a higher percentage of aluminum, and therefore serves to produce the bulk of the hydrogen. The cartridge is suitable for use in the apparatus of FIGS. 9-10, in the manner described above.

It is to be recognized that various alterations, modifications, and/or additions may be introduced into the constructions and arrangements of parts described above without departing from the spirit or ambit of the present invention.

What is claimed is:

1. A method for producing hydrogen using an aluminum-based water-split reaction, said method comprising the steps of:
   providing a matrix having at least one inlet for introducing water at a predetermined location;
   providing a plurality of solid reactant materials for reacting with water to produce hydrogen, the solid reactant materials comprising:
      metallic aluminum;
      at least one water-soluble inorganic salt catalyst that causes progressive pitting of said metallic aluminum to sustain reaction of said metallic aluminum with water; and
      at least one metal oxide initiator that upon exposure to water causes an increase in temperature to initiate reaction of said water with said metallic aluminum;
   differentially distributing said plurality of solid reactant materials in said matrix relative to said at least one inlet so that at least one of said solid reactant materials is present in a selected area of said matrix relative to said inlet in an amount that is proportionally greater than at least one other of said solid reactant materials, the step of differentially distributing said plurality of solid reactant materials comprising:
      concentrating said at least one of said solid reactant materials in at least one predetermined area in said matrix, the step of concentrating said at least one solid reactant material at at least one predetermined area comprising positioning said solid reactant materials in said matrix in a plurality of layers arranged concentrically about said at least one inlet for introducing water, and
   introducing water into said matrix through said at least on inlet so that a flow of said water contacts said area of said matrix containing said proportionally greater amount of at least one solid reactant material and at least one other area of said matrix in a sequential manner so as to affect at least one characteristic of said reaction of said water with said solid reactant materials to produce hydrogen.

2. The method of claim 1, wherein the step of differentially distributing said plurality of reactant materials relative to said at least one inlet comprises differentially distributing said solid reactant materials so as to affect at least one characteristic of said reaction selected from the group consisting of:
   rates of said reaction;
   temperatures of said reaction;
   pressures of said reaction;
   products of said reaction; and
   combinations thereof.

3. The method of claim 2, wherein said products of said reaction comprise one or more of:
   amounts of hydrogen produced by said reaction;
   amounts of heat produced by said reaction; and
   amounts of steam produced by said reaction.

4. The method of claim 2, wherein said products of said reaction comprise one or more of:
   amounts of hydrogen produced by said reaction;
   amounts of heat produced by said reaction; and
   amounts of steam produced by said reaction.

5. The method of claim 1, wherein the step of providing a plurality of solid reactant materials comprises selecting said at least one water-soluble inorganic salt catalyst from the group consisting of:
   sodium chloride;
   potassium chloride; and
   combinations thereof.

6. The method of claim 5, wherein the step of providing a plurality of solid reactant materials further comprises selecting said metal oxide initiator from the group consisting of:
   magnesium oxide;
   calcium oxide; and
   combinations thereof.

7. The method of claim 5, wherein the step of providing a plurality of solid reactant materials further comprises selecting said metal oxide initiator from the group consisting of:
   magnesium oxide;
   calcium oxide; and
   combinations thereof.

8. The method of claim 1, wherein the step of concentrating said at least one of said solid reactant materials in at least one predetermined area of said matrix comprises:
concentrating only one of said solid reactant materials in at least one predetermined area of said matrix.

9. The method of claim 1, wherein the step of concentrating said at least one of said solid reactant materials in at least one predetermined area comprises:
concentrating a combination of two or more of said solid reactant materials in at least one predetermined area of said matrix.

10. The method of claim 1, wherein the step of concentrating said at least one of said solid reactant materials in at least one predetermined area of said matrix comprises:
concentrating said at least one metal oxide initiator in an area proximate said at least one inlet for introducing water, so as to achieve a rapid increase in temperature by immediate contact between said concentrated metal oxide initiator and said flow of water introduced at said inlet.

11. The method of claim 1, wherein the step of concentrating said at least one solid reactant material in at least one predetermined area of said matrix comprises:
concentrating said at least one metal oxide initiator at a plurality of spaced locations through said matrix, so as to achieve a moderated increase in temperature by contact between said concentrated metal oxide initiator and said flow of water introduced at said at least one inlet.

12. The method of claim 1, wherein the step of concentrating said at least one solid reactant material in at least one predetermined area of said matrix comprises:
concentrating said at least one inorganic salt catalyst in an area proximate said at least one inlet for introducing water, so as to achieve a rapid increase in dissolved salt catalyst by contact between said concentrated salt catalyst and said flow water introduced at said inlet.

13. The method of claim 1, wherein the step of concentrating said at least one of said solid reactant materials in at least one predetermined area of said matrix comprises:
concentrating said at least one inorganic salt catalyst in a plurality of spaced locations through said matrix, so as to achieve a moderated increase in dissolved salt catalyst by contact between said concentrated salt catalyst and said flow of water introduced at said at least one inlet.

14. The method of claim 1, wherein the step of differentially distributing said plurality of solid reactant materials in said matrix comprises:
depositing said solid reactant materials on at least one water permeable substrate; and
placing in said matrix said water permeable substrate having said solid reactant materials deposited thereon.

15. The method of claim 14, wherein the step of depositing said solid reactant materials on at least one water permeable substrate comprises:
providing a water permeable substrate that is formed of a fibrous mass.

16. The method of claim 15, wherein the step of providing said water permeable substrate formed of a fibrous mass comprises providing a water permeable substrate formed of a fibrous mass selected from the group consisting of:
metallic fiber wool materials;
non-metallic fiber wool materials; and
combinations thereof.

17. The method of claim 14, wherein the step of placing in said matrix said permeable substrate having said solid reactant materials deposited thereon comprises:
placing said permeable substrate having said solid reactant materials deposited thereon in an expendable container so as to form a disposable cartridge.

18. The method of claim 1, further comprising the step of:
introducing water into said matrix at said at least one inlet so as to produce said aluminum-based water-split reaction.

19. The method of claim 18, further comprising the step of:
capturing at least one product of said aluminum-based water-split reaction to supply power to at least one load.

20. The method of claim 19, wherein the step of capturing at least one product of said aluminum-based water-split reaction comprises capturing a product of said reaction from the group consisting of:
hydrogen;
heat;
steam; and
combinations thereof.

21. The method of claim 1, wherein the step of differentially distributing said plurality of reactant materials relative to said at least one inlet comprises differentially distributing said solid reactant materials so as to affect at least one characteristic of said reaction selected from the group consisting of:
rates of said reaction;
temperatures of said reaction;
pressures of said reaction;
products of said reaction; and
combinations thereof.

22. The method of claim 1, wherein the step of providing a plurality of solid reactant materials comprises selecting said at least one water-soluble inorganic salt catalyst from the group consisting of:
sodium chloride;
potassium chloride; and
combinations thereof.

23. An apparatus for producing hydrogen using an aluminum-based water split reaction, said apparatus comprising:
a matrix having at least one inlet for introducing water at a predetermined location therein;
a plurality of solid reactant materials for reacting with water to produce hydrogen, said solid reactant materials comprising:
metallic aluminum;
at least one water-soluble inorganic salt catalyst that creates progressive pitting of said metallic aluminum to sustain reaction of said metallic aluminum with water; and
at least one metal oxide initiator that upon exposure to water causes an increase in temperature to initiate reaction of said water with said metallic aluminum;
said plurality of solid reactant materials being differentially distributed in said matrix relative to said at least one inlet so that at least one of said solid reactant materials is concentrated in at least one predetermined area in said matrix relative to said inlet in an amount that is proportionately greater than at least one other of said solid reaction materials, said differentially distributed solid reactant materials being positioned in a plurality of layers in said matrix arranged substantially concentrically about said at least one inlet for introducing water;
so that when water is introduced into said matrix through said at least one inlet a flow of said water will contact said area of said matrix containing said proportionately greater amount of at least one solid reactant material and other areas in said matrix in a sequential manner so as to affect at least one characteristic of said reaction of said water with said solid reactant materials to produce hydrogen.

24. The apparatus of claim 23, wherein said plurality of solid reactant materials are differentially distributed in said matrix relative to said at least one inlet so as to affect at least one characteristic of said reaction selected from the group consisting of:
   rates of said reaction;
   temperatures of said reaction;
   pressures of said reaction;
   products of said reaction; and
   combinations thereof.

25. The apparatus of claim 24, wherein said products of said reaction comprise one or more of:
   amounts of hydrogen produced by said reaction;
   amounts of heat produced by said reaction; and
   amounts of steam produced by said reaction.

26. The apparatus of claim 23, wherein said plurality of solid reactant materials comprises:
   a plurality of solid reactant materials in particulate form.

27. The apparatus of claim 23, wherein said water-soluble inorganic salt catalyst is selected from the group consisting of:
   sodium chloride;
   potassium chloride; and
   combinations thereof.

28. The apparatus of claim 27, wherein said metal oxide initiator is selected from the group consisting of:
   magnesium oxide;
   calcium oxide; and
   combinations thereof.

29. The apparatus of claim 23, further comprising:
   at least one water permeable substrate on which said plurality of solid reactant materials are deposited to be placed in said matrix.

30. The apparatus of claim 29, wherein said water permeable substrate comprises:
   a substrate formed of a mass of fibrous material.

31. The apparatus of claim 30, wherein said mass of fibrous material comprises a mass formed of a fibrous material selected from the group consisting of:
   metallic fiber wool materials;
   non-metallic fiber wool materials; and
   combinations thereof.

32. The apparatus of claim 29, wherein said water permeable substrate comprises:
   at least one layer that surrounds said at least one inlet for introducing water.

33. The apparatus of claim 32, wherein said at least one inlet for introducing water comprises:
   an inlet tube having a plurality of openings for distributing water into said matrix, said inlet tube being surrounded by said at least one layer of said water permeable substrate.

34. The apparatus of claim 32, wherein said at least one layer of water permeable substrate comprises:
   a plurality of layers of water permeable substrate with differing combinations of said plurality of solid reactant materials deposited thereon.

35. The apparatus of claim 32, wherein said at least one layer of water permeable substrate comprises a layer of water permeable substrate having at least one of said solid reactant materials distributed generally thereover and at least one packet of at least one other of said plurality of solid reactant materials positioned at at least one discreet location thereon.

36. The apparatus of claim 35, wherein said at least one packet of said at least one other of said plurality of solid reactant materials comprises:
   a plurality of said packets positioned at a plurality of discreet locations on said layer of water permeable substrate.

37. The apparatus of claim 29, further comprising:
   a container that encloses said water permeable substrate and said plurality of solid reactant materials so as to form an expendable cartridge.

38. The apparatus of claim 37, wherein said at least one inlet for introducing water comprises at least one inlet tube having a plurality of openings for distributing water into said matrix, and said at least one layer of water permeable substrate comprises:
   at least one layer of water permeable substrate that is rolled spirally about said inlet tube so as to form a fuel body that is enclosed within said container.

39. The apparatus of claim 38, wherein said container comprises:
   an inlet connection at at least one end of said container for admitting water to said inlet tube so as to distribute water to said fuel body in said container.

40. The apparatus of claim 39, wherein said container comprises:
   a generally cylindrical disposable container formed of thin aluminum metal material.

41. A method for producing hydrogen using an aluminum-based water-split reaction, said method comprising the steps of:
   providing a matrix having at least one inlet for introducing water at a predetermined location;
   providing a plurality of solid reactant materials for reacting with water to produce hydrogen, the solid reactant materials comprising:
   metallic aluminum;
   at least one water-soluble inorganic salt catalyst that causes progressive pitting of said metallic aluminum to sustain reaction of said metallic aluminum with water; and
   at least one metal oxide initiator that upon exposure to water causes an increase in temperature to initiate reaction of said water with said metallic aluminum;
   differentially distributing said plurality of solid reactant materials in said matrix relative to said at least one inlet so that at least one of said solid reactant materials is present in a selected area of said matrix relative to said inlet in an amount that is proportionally greater than at least one other of said solid reactant materials the step of differentially distributing said plurality of solid reactant materials comprising:
   concentrating said at least one of said solid reactant materials in at least one predetermined area in said matrix, the step of concentrating said at least one solid reactant material at at least one predetermined area comprising:
   positioning said solid reactant materials in said matrix in a plurality of layers arranged concentrically about said at least one inlet for introducing water, and
   introducing water into said matrix through said at least on inlet so that a flow of said water contacts said area of said matrix containing said proportionally greater amount of at least one solid reactant material and at least one other area of said matrix in a sequential manner so as to affect at least one characteristic of said reaction of said water with said solid reactant materials to produce hydrogen.

42. A method for producing hydrogen using an aluminum-based water-split reaction, said method comprising the steps of:
  providing a matrix having at least one inlet for introducing water at a predetermined location;
  providing a plurality of solid reactant materials for reacting with water to produce hydrogen, the solid reactant materials comprising:
    metallic aluminum;
    at least one water-soluble inorganic salt catalyst that causes progressive pitting of said metallic aluminum to sustain reaction of said metallic aluminum with water; and
    at least one metal oxide initiator that upon exposure to water causes an increase in temperature to initiate reaction of said water with said metallic aluminum;
  differentially distributing said plurality of solid reactant materials in said matrix relative to said at least one inlet so that at least one of said solid reactant materials is present in a selected area of said matrix relative to said inlet in an amount that is proportionally greater than at least one other of said solid reactant materials, the step of differentially distributing said plurality of solid reactant materials comprising:
    concentrating said at least one inorganic salt catalyst in a predetermined area in said matrix proximate said at least one inlet for introducing water, so as to achieve a rapid increase in dissolved salt catalyst by contact between said concentrated salt catalyst and said flow water introduced at said inlet; and
  introducing water into said matrix through said at least on inlet so that a flow of said water contacts said area of said matrix containing said proportionally greater amount of at least one solid reactant material and at least one other area of said matrix in a sequential manner so as to affect at least one characteristic of said reaction of said water with said solid reactant materials to produce hydrogen.

43. An apparatus for producing hydrogen using an aluminum-based water split reaction, said apparatus comprising:
  a matrix having at least one inlet for introducing water at a predetermined location therein;
  a plurality of solid reactant materials for reacting with water to produce hydrogen, said solid reactant materials comprising:
    metallic aluminum;
    at least one water-soluble inorganic salt catalyst that creates progressive pitting of said metallic aluminum to sustain reaction of said metallic aluminum with water; and
    at least one metal oxide initiator that upon exposure to water causes an increase in temperature to initiate reaction of said water with said metallic aluminum;
  said plurality of solid reactant materials being differentially distributed in said matrix relative to said at least one inlet so that at least one of said solid reactant materials is concentrated in at least one predetermined area in said matrix relative to said inlet in an amount that is proportionately greater than at least one other of said solid reaction materials, said differentially distributed solid reactant materials being positioned in a plurality of layers in said matrix arranged spirally about said at least one inlet for introducing water;
  so that when water is introduced into said matrix through said at least one inlet a flow of said water will contact said area of said matrix containing said proportionately greater amount of at least one solid reactant material and other areas in said matrix in a sequential manner so as to affect at least one characteristic of said reaction of said water with said solid reactant materials to produce hydrogen.

44. The apparatus of claim 43, wherein said plurality of solid reactant materials are differentially distributed in said matrix relative to said at least one inlet so as to affect at least one characteristic of said reaction selected from the group consisting of:
  rates of said reaction;
  temperatures of said reaction;
  pressures of said reaction;
  products of said reaction; and
  combinations thereof.

45. The apparatus of claim 43, wherein said plurality of solid reactant materials comprises:
  a plurality of solid reactant materials in particulate form.

46. The apparatus of claim 43, wherein said water-soluble inorganic salt catalyst is selected from the group consisting of:
  sodium chloride;
  potassium chloride; and
  combinations thereof.

47. The apparatus of claim 46, wherein said metal oxide initiator is selected from the group consisting of:
  magnesium oxide;
  calcium oxide; and
  combinations thereof.

48. An apparatus for producing hydrogen using an aluminum-based water split reaction, said apparatus comprising:
  a matrix having at least one inlet for introducing water at a predetermined location therein;
  a plurality of solid reactant materials for reacting with water to produce hydrogen, said solid reactant materials comprising:
    metallic aluminum;
    at least one water-soluble inorganic salt catalyst that creates progressive pitting of said metallic aluminum to sustain reaction of said metallic aluminum with water; and
    at least one metal oxide initiator that upon exposure to water causes an increase in temperature to initiate reaction of said water with said metallic aluminum;
  said plurality of solid reactant materials being differentially distributed in said matrix relative to said at least one inlet so that at least one of said solid reactant materials is present on a selected area in said matrix relative to said inlet in an amount that is proportionately greater than at least one other of said solid reaction materials, said at least one solid reactant material that is concentrated in at least one selected area of said matrix comprising:
    at least one said inorganic salt catalyst concentrated proximate said at least one inlet for introducing water, so that said inorganic salt catalyst is rapidly dissolved upon introduction of water via said inlet;
  so that when water is introduced into said matrix through said at least one inlet a flow of said water will contact said area of said matrix containing said proportionately greater amount of at least one solid reactant material and other areas in said matrix in a sequential manner so as to affect at least one characteristic of said reaction of said water with said solid reactant materials to produce hydrogen.

* * * * *